(12) United States Patent
Kuenzner

(10) Patent No.: US 6,744,374 B1
(45) Date of Patent: Jun. 1, 2004

(54) SETTING DEVICE WITH ROTATING ACTUATOR AND ILLUMINATED INDEX DISPLAY

(75) Inventor: Hermann Kuenzner, Freising (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 586 days.

(21) Appl. No.: 09/677,783

(22) Filed: Oct. 2, 2000

(51) Int. Cl.[7] .................................................. G08B 5/24
(52) U.S. Cl. .......................... 340/815.78; 340/815.86; 340/815.48; 340/815.53; 200/312; 200/314; 200/315; 200/316; 200/341; 200/336; 362/555; 362/800
(58) Field of Search ....................... 340/815.78, 815.86, 340/815.48, 815.53; 200/312, 314, 315, 316, 341, 336; 362/555, 800

(56) References Cited

U.S. PATENT DOCUMENTS

| | | | |
|---|---|---|---|
| 4,041,723 A | * | 8/1977 | Weibel, Jr. et al. ............ 62/126 |
| 5,679,933 A | * | 10/1997 | Weber et al. ................ 187/395 |
| 5,912,537 A | * | 6/1999 | Yang ........................... 318/280 |
| 5,931,378 A | | 8/1999 | Schramm |
| 6,205,801 B1 | * | 3/2001 | Riglos et al. .................. 62/231 |
| 6,348,772 B1 | * | 2/2002 | May ............................ 318/430 |

FOREIGN PATENT DOCUMENTS

| | | |
|---|---|---|
| DE | 93 00 295 | 6/1993 |
| DE | 196 21 025 | 11/1997 |
| DE | 19704412 | 5/1998 |
| DE | 19621025 | 3/1999 |
| DE | 198 08 464 | 9/1999 |
| EP | 0605324 | 3/2001 |
| GB | 2 313 481 | 11/1997 |

OTHER PUBLICATIONS

European Search Report.

* cited by examiner

*Primary Examiner*—Daniel J. Wu
*Assistant Examiner*—Tai T. Nguyen
(74) *Attorney, Agent, or Firm*—Crowell & Moring LLP

(57) ABSTRACT

A setting device includes a rotating actuator, a switch, an illuminated index display on which a value which is manually set at the rotating actuator is assigned to the rotating actuator and, by actuating the switch, the manual setting at the rotating actuator can be overridden. To improve the display of the setting device, a light device is provided in addition to the rotating actuator. The switch, aside from its actual switching function, is constructed for switching over between the illumination of the index display and the operation of the light device. The illumination of the index display is activated when the rotating actuator is a manual mode, and the light device is activated when a different mode is set by the actuation of the switch.

29 Claims, 1 Drawing Sheet

US 6,744,374 B1

SETTING DEVICE WITH ROTATING ACTUATOR AND ILLUMINATED INDEX DISPLAY

BACKGROUND AND SUMMARY OF THE INVENTION

This application claims the priority of German Patent Document 199 47 406.0, filed Oct. 1, 1999, the disclosure of which is expressly incorporated by reference herein.

The invention relates to a setting device, with a rotating actuator and a switch, an illuminated index display assigned to the rotating actuator on which a value can be read which is manually set at the rotating actuator, can be read, and by actuating the switch, the manual setting at the rotating actuator can be overridden.

In the case of rotating actuators, it is generally known that an index, which comprises, in particular, a pointer, may be provided so that an operator can recognize the rotated position, which has been set, even at night. Furthermore, the combination of a rotating actuator with a switch is known, so that a value can be set with the rotating actuator and a different mode can be selected with the switch. In a different mode, such as an automatic mode, the value, set manually at the rotating actuator, is overridden. In order to indicate to the operator whether a device is in a manual or in a different mode, the latter frequently is represented by the operation of a separate illuminant.

However, such separate representations are expensive. Furthermore, incremental transmitters are frequently used as rotating actuators, which do not have an end stop and thus no tactile acknowledgment. Such an incremental actuator is necessary in order to be able to override a manual setting, for example, by an automatic mode or a remote control.

It is an object of the present invention to provide a setting device, for which a simple display of an active functioning mode is possible.

This objective is accomplished by providing a setting with a rotating actuator and a switch, an illuminated index display assigned to the rotating actuator on which a value can be which is manually set at the rotating actuator, and by actuating the switch, the manual setting at the rotating actuator can be overridden, wherein a light device is provided in addition to the rotating actuator, wherein the switch, in addition to having an actual switching function, is operable for switching over between illumination of the index display and operation of the light device, and wherein at the rotating actuator the illumination of the index display is activated when the rotating actuator is in a manual mode and the light device is activated when a different mode is set by the actuation of the switch.

A key concept of the invention is seen therein that, in addition to an index display (such as a scale or pointer), which can be illuminated, an additional illuminant is provided for the rotating actuator. A switch is constructed so that, aside from its actual switching function, when the switch is actuated, it is possible to switch over between the illumination of the index display and the operation of the illuminant. In each case, moreover, only one illumination of the rotating actuator is activated.

The display of the mode that is active, namely of the manually adjustable index display or of the mode assigned to the illuminant, accordingly is displayed at the rotating actuator itself. With that, a separately disposed display or illuminant no longer is necessary. Moreover, there is no need for a separate display or illuminant. In addition, an unambiguous assignment to "display—control element" is possible. Furthermore, the problem that the rotated position of the rotating actuator possibly does not agree with the value indicated by the index display, is avoided.

The switch may be provided separately or directly in combination with the rotating actuator. In particular, a so-called rotating push button is suitable for realizing the invention, since the rotating and switching functions are combined in an advantageous and appropriate manner in such a push button.

A particular embodiment of the invention is characterized in that the rotating actuator of the control element is a potentiometer. As a rule, a potentiometer has two stops so that a simple tactile acknowledgment of a minimum and a maximum position is readily possible.

A simple embodiment of the invention is characterized in that the index display (such as a pointer or a scale) is formed or illuminated by an LED or by a fiber optical light guide.

The illuminant may be a display, which is also illuminated by an LED, a fiber optical light guide or by a different illuminant.

Other objects, advantages and novel features of the present invention will become apparent from the following detailed description of the invention when considered in conjunction with the accompanying drawings.

DETAILED DESCRIPTION OF THE DRAWINGS

For the description of the examples of the present invention, in each case a rotating push button is used, which comprises a potentiometer with two end stops (not shown). The representation of the device and circuit assigned to this rotating push button was omitted.

Figure 1A:
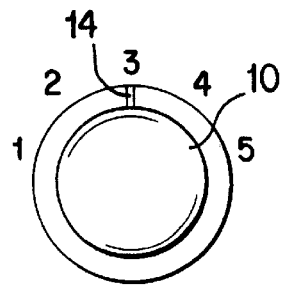
FIG. 1a is a diagrammatic representation of a rotating push button with an active index pointer, constructed according to a preferred embodiment of the present invention.
Figure 1B:
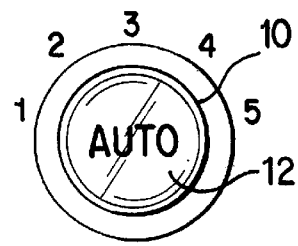
FIG. 1b shows a representation, similar to that of FIG. 1a, shown with the index pointer inactivated and the automatic mode activated.

FIGS. 1a and 1b show a rotating push button 10 with an index pointer 14, which can be illuminated. When the rotating push button 10 is rotated, the index pointer can be moved over the scale range from 1 to 5. In FIG. 1a, it is set at a value of 3 and illuminated. In this mode, manual adjustment is possible. By rotating the rotating push button 10, acting as operating element, a signal is produced by the potentiometer and passed on to an element, which is to be controlled. The signal corresponds to the value on the scale, which is indicated by the index pointer 14. The example of FIGS. 1a and 1b relates in the present case to controlling the amount of air of an air conditioner in a motor vehicle. For the manual mode, the operator can increase or decrease the amount of air by rotating the rotating push button 10 to the right or to the left.

In addition, a display 12 is disposed in the rotating push button 10 and illuminated in FIG. 1 by means of a light. This display 12 is illuminated when changing over from the manual mode to an automatic mode by depressing the rotating push button 10. Upon switching over, the illumination of the index pointer 14 is switched off and the inscription "AUTO" lights up. In the present case, switching back to the manual mode can be achieved by explicitly switching off the automatic mode. For this purpose, when the automatic mode is active, the rotating push button 14 must be depressed.

Figure 2A:
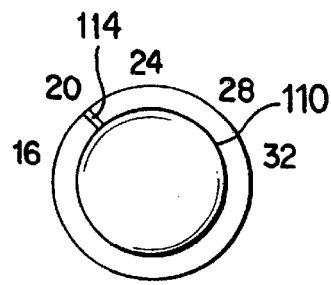
FIG. 2a is a diagrammatic representation of a further embodiment of an inventive rotating push button with an activated index pointer.
Figure 2B:
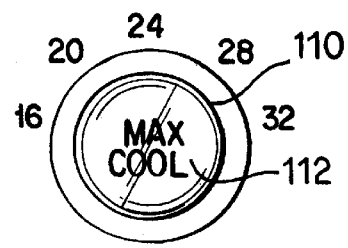
FIG. 2b shows a representation, similar to that of FIG. 2a, shown with an inactivated index pointer and an activated display.

The embodiment of FIGS. 2a and 2b corresponds to the embodiment of FIGS. 1a and 1b and differs from the latter only owing to the fact that the rotating push button 14 serves for the selection of the temperature as well as for triggering the maximum cooling function. Instead of the expression "AUTO", the expression "MAX COOL" now appears in the display 112. Moreover, the scaling is altered. This embodiment can be used to select a maximum cooling function, which is used particularly in the automobile sector in so-called "hot countries" (setting to "MAX COOL" or "MAX A/C").

It is possible to switch between the manual mode, namely a setting of a value on the scale of 16 to 32, and the "MAX COOL" mode by depressing the rotating push button 110. At the manual setting (index pointer 114 active), the temperature is adjusted manually.

In an alternative embodiment, it is possible to return from the so-called "automatic function" to the manual function also by only rotating the rotating push button. For the evaluation and for switching over, a control may be provided, which is not shown.

Figure 3A:
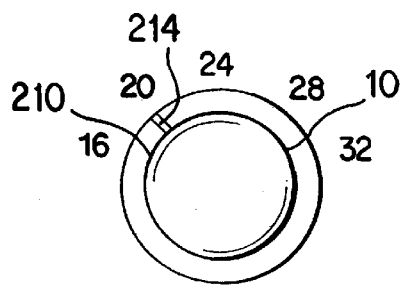
FIGS. 3a to 3d are diagrammatic representations of two rotating push buttons, for which a manual index display or a display is active, depending on the actuation, constructed according to other preferred embodiments of the invention.
Figure 3B:
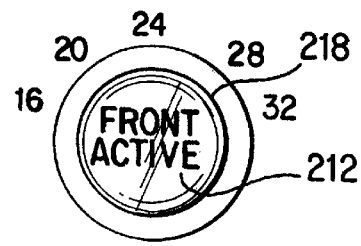
Figure 3C:
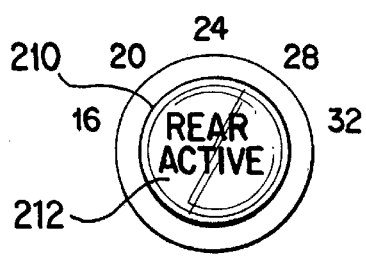

The embodiment of FIGS. 3a to 3d shows rotating push buttons 210, 218 for setting the temperature in a vehicle, the rotating push button 210 (FIGS. 3a and 3c) being disposed in the front area of the vehicle and the rotating push button 218 (FIGS. 3b and 3d) in the rear. Particularly in the case of rear-oriented luxury vehicles, it is customary that the rear passenger can override the front setting of the air conditioner, in order to utilize the air conditioner fully for himself. In the case of the present embodiment, the front rotating push button 210, in accordance with the setting in FIG. 3a, is active. This is indicated to the passenger seated in the rear by the display "front active" of the rotating push button 18 disposed there. The passenger, seated in the front of the vehicle, recognizes the active rotating push button 210 by the illumination of the index pointer 214. In this case, the temperature (here scale 16 to 32) can be adjusted only over the front rotating push button 210.

Figure 3D:
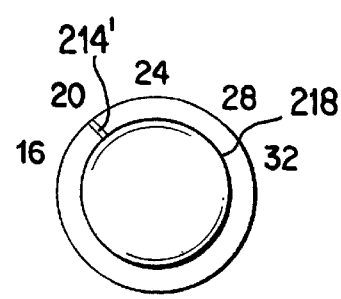

If now the temperature is to be adjustable by the rear passenger, the latter depresses his rotating push button 218, as a result of which the display in his rotating push button is extinguished and, instead, the index pointer 214' at his rotating push button lights up (FIG. 3d). The rear passenger can now adjust the temperature manually over his rotating push button 218. This mode is indicated to the vehicle passenger in the front by the activation of the inscription "rear active" in the display 212 of his rotating push button 210. At the same time, the illumination of his index pointer 214 is switched off. In this mode, the passengers in the front of the vehicle do not have the possibility of adjusting the temperature.

In order to become "master" once again, the passenger in the front must depress his rotating push button 210 once again. By so doing, the setting by the rear passenger at this rotating push button 210 is not changed; this represents an advantage over present display solutions. Alternatively, switching over can also be achieved only by the rotational actuation of a rotating push button.

Alternatively to the embodiment shown, a rotating actuator and a switch, which are combined into a rotating push button in the present embodiments, can also be provided separately. What matters is that the operating mode of the rotating actuator can be indicated over the additional illuminant (such as a display, which can be illuminated), which is assigned to it. To this extent, the invention is therefore not limited to the present embodiments. It offers a simple and cost-effective as well as self-explaining operating unit and makes a simple display of an active mode possible.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A setting device with a rotating actuator and a switch, an illuminated index display assigned to the rotating actuator on which a value can be read which is manually set at the rotating actuator, the switch being operable such that the manual setting at the rotating actuator can be overridden by actuating the switch, wherein a light device is provided in addition to the rotating actuator, wherein the switch, in addition to having an actual switching function, is operable for switching over between illumination of the index display and operation of the light device, and wherein at the rotating actuator the illumination of the index display is activated when the rotating actuator is in a manual mode and the light device is activated when a different mode is set by the actuation of the switch.

2. The setting device of claim 1, wherein the switch is provided separately from the rotating actuator.

3. The setting device of claim 2, wherein the rotating actuator is a control element of a potentiometer.

4. The setting device of claim 2, wherein the index display comprises a pointer which is illuminated or formed by an LED or a fiber optical light guide.

5. The setting device of claim 2, wherein the index display comprises a scale which can be illuminated.

6. The device according to claim 2, wherein the light device comprises a display which can be illuminated by an illuminant.

7. The setting device according to claim 2, wherein the rotating actuator is constructed so that, by its actuation, it is operable to switch over from operation of the light device to the index display, which can be illuminated.

8. The setting device of claim 1, wherein the rotating actuator and the switch are combined in the form of a rotating push button.

9. The setting device of claim 8, wherein the rotating actuator is a control element of a potentiometer.

10. The setting device of claim 8, wherein the index display comprises a pointer which is illuminated or formed by an LED or a fiber optical light guide.

11. The setting device of claim 8, wherein the index display comprises a scale which can be illuminated.

12. The device according to claim 8, wherein the light device comprises a display which can be illuminated by an illuminant.

13. The setting device according to claim 8, wherein the rotating actuator is constructed so that, by its actuation, it is operable to switch over from operation of the light device to the index display, which can be illuminated.

14. The setting device of claim 1, wherein the rotating actuator is a control element of a potentiometer.

15. The setting device of claim 14, wherein the index display comprises a pointer which is illuminated or formed by an LED or a fiber optical light guide.

16. The setting device of claim 14, wherein the index display comprises a scale which can be illuminated.

17. The device according to claim 14, wherein the light device comprises a display which can be illuminated by an illuminant.

18. The setting device according to claim 14, wherein the rotating actuator is constructed so that, by its actuation, it is operable to switch over from operation of the light device to the index display, which can be illuminated.

19. The setting device of claim 1, wherein the index display comprises a pointer which is illuminated or formed by an LED or a fiber optical light guide.

20. The setting device of claim 19, wherein the index display comprises a scale which can be illuminated.

21. The device according to claim 19, wherein the light device comprises a display which can be illuminated by an illuminant.

22. The setting device according to claim 19, wherein the rotating actuator is constructed so that, by its actuation, it is operable to switch over from operation of the light device to the index display, which can be illuminated.

23. The setting device of claim 1, wherein the index display comprises a scale which can be illuminated.

24. The device according to claim 23, wherein the light device comprises a display which can be illuminated by an illuminant.

25. The setting device according to claim 23, wherein the rotating actuator is constructed so that, by its actuation, it is operable to switch over from operation of the light device to the index display, which can be illuminated.

26. The setting device of claim 1, wherein the light device comprises a display which can be illuminated by an illuminant.

27. The setting device of claim 1, wherein the rotating actuator is constructed so that, by its actuation, it is operable to switch over from operation of the light device to the index display, which can be illuminated.

28. The setting device according to claim 1, wherein the actuator is operable to control a passenger vehicle air conditioner.

29. The setting device according to claim 28, setting device, said first and second setting devices being disposed in a vehicle in respective front and back passenger sections and being operably interconnected with one another.

* * * * *